United States Patent
Ikeda et al.

(10) Patent No.: US 6,685,804 B1
(45) Date of Patent: Feb. 3, 2004

(54) METHOD FOR FABRICATING ELECTRODE FOR RECHARGEABLE LITHIUM BATTERY

(75) Inventors: Hiroaki Ikeda, Kobe (JP); Yoichi Domoto, Ikoma (JP); Hiromasa Yagi, Nishinomiya (JP); Hisaki Tarui, Kobe (JP); Masahisa Fujimoto, Osaka (JP); Shin Fujitani, Kobe (JP); Masaki Shima, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/111,072
(22) PCT Filed: Oct. 20, 2000
(86) PCT No.: PCT/JP00/07300
§ 371 (c)(1),
(2), (4) Date: Apr. 19, 2002
(87) PCT Pub. No.: WO01/29914
PCT Pub. Date: Apr. 26, 2001

(30) Foreign Application Priority Data

| Oct. 22, 1999 | (JP) | 11-301646 |
| Oct. 22, 1999 | (JP) | 11-301679 |
| Dec. 22, 1999 | (JP) | 11-365306 |
| Jan. 12, 2000 | (JP) | 2000-3644 |

(51) Int. Cl.[7] .................. C23C 14/34; C23C 16/00; B05D 5/12; H01S 4/00
(52) U.S. Cl. ............. 204/192.12; 427/58; 427/255.23; 427/397.7; 29/592.1
(58) Field of Search .............. 204/192.12, 192.23; 427/58, 255.23, 397.7; 29/592.1

(56) References Cited

U.S. PATENT DOCUMENTS 5,580,686 A * 12/1996 Shi et al. ............. 429/245
5,665,492 A * 9/1997 Sotomura ............. 429/213
6,511,516 B1 * 1/2003 Johnson et al. ............. 29/623.1

FOREIGN PATENT DOCUMENTS

| EP | 0 328 257 A2 | 8/1989 |
| EP | 0 855 752 A2 | 7/1998 |
| JP | 6-207866 A | 7/1994 |
| JP | 7-302588 A | 11/1995 |
| JP | 7-307152 A | 11/1995 |
| JP | 8-50922 A | 2/1996 |
| JP | 9-249962 A | 9/1997 |
| JP | 10-199524 A | 7/1998 |
| JP | 11-86850 A | 3/1999 |
| JP | 11-135115 A | 5/1999 |
| JP | 11-185744 A | 7/1999 |
| JP | 11-233116 A | 8/1999 |
| JP | 2000-12089 A | 1/2000 |
| JP | 2000-100429 A | 4/2000 |

OTHER PUBLICATIONS

English translation of JP 2000–100429.*
English translation of JP 2000–012089.*
English translation of JP 11–233116.*
English translation of JP 7–307152.*
English translation of JP 7–302588.*
Bourderau, S. et al.; "Amorphous Silicon as a Possible Anode Material for Li–ion Batteries"; *Journal of Power Sources*; vosl. 81–82, pp. 233–236, 1999.

* cited by examiner

Primary Examiner—Steven H. VerSteeg
(74) Attorney, Agent, or Firm—Kubovcik & Kubovcik

(57) ABSTRACT

A method for fabricating an electrode for a rechargeable lithium battery which includes depositing a thin film composed of active material capable of alloy formation with lithium on a current collector made of a metal incapable of alloy formation with lithium, by using a process for depositing a thin film by supplying a material from a gas phase, characterized in that the thin film of active material is deposited at such a temperature that enables formation of a mixed layer via diffusion of a constituent of the current collector into the thin film in the vicinity of an interface therebetween.

11 Claims, 7 Drawing Sheets

METHOD FOR FABRICATING ELECTRODE FOR RECHARGEABLE LITHIUM BATTERY

TECHNICAL FIELD

The present invention relates to a method for fabricating a novel electrode for a rechargeable lithium battery.

BACKGROUND ART

The battery performance of rechargeable lithium batteries recently under intensive research and development, such as charge-discharge voltage, cycle life characteristics or storage characteristics, depends largely upon the types of the electrodes used. This has led to the attempts to better battery performance by improving electrode active materials.

The use of metallic lithium for the negative active material, although possible to construct a battery with high energy density per weight and volume, presents a problem that the lithium deposited on charge grows into dendrite which might cause internal short-circuiting.

Rechargeable lithium batteries are reported (Solid State Ionics, 113–115, p57 (1998)) which use an electrode consisting of aluminum, silicon, tin or the like that is electrochemically alloyed with lithium on charge. Among these, a silicon electrode provides a particularly high theoretical capacity and is promising as a high-capacity negative electrode. For this reason, various rechargeable batteries using silicon for the negative electrode are proposed (Japanese Patent Laid-Open No. Hei 10-255768). However, such alloying negative electrodes fail to provide sufficient cycle characteristics since alloys, as electrode active materials, are themselves pulverized on charge and discharge to reduce current-collecting capabilities.

As a rechargeable lithium battery which uses silicon for the electrode active material and exhibits good charge-discharge cycle characteristic, the present applicant has proposed a rechargeable lithium battery which incorporates a microcrystalline or amorphous silicon thin film deposited on a current collector by a CVD, sputtering or other thin-film forming processes (Japanese Patent Laying-Open No. Hei 11-301646 and others).

DISCLOSURE OF THE INVENTION

It is an object of the present invention to provide a method for fabricating an electrode, for a rechargeable lithium battery, which uses a thin film of active material, such as a silicon thin film, and can provide a high charge-discharge capacity and good charge-discharge cycle characteristics.

A method for fabricating an electrode for a rechargeable lithium battery, in accordance with the present invention, includes depositing a thin film composed of active material capable of alloy formation with lithium on a current collector made of a metal incapable of alloy formation with lithium, using a process for depositing a thin film by supplying a material thereof from a gas phase, and is characterized in that the thin film of active material is deposited at such a temperature that enables formation, of a mixed layer via diffusion of a constituent of the current collector into the thin film in the vicinity of an interface therebetween.

Examples of processes that can deposit a thin film of active material by supplying the material from a gas phase include sputtering, CVD, vacuum evaporation and spraying processes.

In the present invention, any material can be used for the active material if it can form an alloy with lithium. Examples of such materials include silicon, germanium, tin, lead, zinc, magnesium, sodium, aluminum, gallium, indium and the like.

In view of the easiness of thin-film deposition by the aforementioned deposition method, the active material composed mainly of silicon or germanium is preferred. In view of the ability to provide a high charge-discharge capacity, the active material composed mainly of silicon is particularly preferred. Also preferably, the thin film of active material has the amorphous or microcrystalline form. Accordingly, an amorphous or microcrystalline silicon thin film is preferred as the thin film of active material. The thin film is identified as an amorphous silicon thin film when Raman spectroscopy detects the substantial absence of a peak around 520 $cm^{-1}$ corresponding to a crystal region, and as a microcrystalline thin film when Raman spectroscopy detects the substantial presence of a peak around 520 $cm^{-1}$ corresponding to a crystalline region and a peak around 480 $cm^{-1}$ corresponding to an amorphous region. Other examples of preferred thin films include an amorphous germanium thin film, a microcrystalline germanium thin film, an amorphous silicon-germanium alloy thin film, and a microcrystalline silicon-germanium alloy thin film.

The current collector for use in the present invention is composed of a material incapable of alloy formation with lithium, such as copper.

In the present invention, the thin film of active material is deposited at such a temperature that enables formation of a mixed layer via diffusion of a constituent of the current collector into the thin film in the vicinity of an interface therebetween. That is, the diffusion of the current collector constituent into the thin film of active material is promoted as the temperature (thin-film forming temperature) at which the thin film of active material is deposited is increased. Accordingly, in the present invention, the thin film of active material is deposited at a temperature that enables sufficient diffusion of the current collector constituent into the thin film and sufficient formation, in the thin film, of the mixed layer consisting of the current collector constituent and the active material.

The formation of the mixed layer via diffusion of the current collector constituent into the thin film of active material improves adhesion of the thin film to the current collector. Also, the current collector constituent is a metal element which does not form an alloy with lithium. The diffusion of such a current collector constituent into the thin film of active material results in the relative reduction of expansion and shrinkage of the thin film of active material when it stores and releases lithium. A stress produced in the thin film of active material when it expands and shrinks is thus lowered in its location adjacent to the current collector. This prevents the thin film of active material, if its volume expands and shrinks, from separating from the current collector, and thus achieves further improvement of adhesion between the current collector and the thin film of active material.

In the mixed layer, the concentration of the current collector constituent in the thin film is found to be higher in the vicinity of an interface between the thin film and the current collector, and is lower at a location closer to the surface of the thin film of active material. This continuously decreasing concentration gradient of the current collector constituent in the mixed layer is considered to indicate the formation of a solid solution between the current collector constituent and the active material.

The higher thin film-forming temperature causes the excessive diffusion of the current collector constituent into the thin film and results in the increased tendency of the current collector constituent to form an intermetallic compound with the active material. The formation of such an intermetallic compound reduces the number of sites serving as the active material since the active material atoms are incorporated in the compound, so that a charge-discharge capacity of the thin film of active material is reduced. The formation of the intermetallic compound also reduces adhesion of the current collector to the thin film of active material. It is thus preferred that the thin film of active material is deposited on the current collector at such a temperature that does not produce, in the mixed layer, an intermetallic compound between the active material and the current collector constituent. Such a temperature is preferably below 300° C.

In the present invention, a heat treatment may be performed after the thin film of active material is deposited on the current collector. The heat treatment allows further diffusion of the current collector constituent into the thin film. Hence, in the case where the mixed layer is formed to an insufficient thickness due to the failure to cause sufficient diffusion of the current collector constituent into the thin film during formation of the thin film, the practice of such a heat treatment is preferred. Preferably, the heat treatment is carried out under the conditions that avoid excessive diffusion of the current collector constituent and thus prevent formation of an intermetallic compound between the current collector constituent and the active material, as described above. A temperature for the heat treatment is preferably below 650°C., more preferably 400° C. or lower.

In the present invention, the particularly preferred current collector constituent that diffuses into the thin film is copper. Preferably, at least a surface portion of the current collector is composed mainly of copper, since the copper diffuses from the surface portion of the current collector into the thin film.

In the present invention, the thin film of active material can be deposited by sputtering. In such an instance, a power density applied to a target containing constituent atoms of the active material is preferably 50 W/cm$^2$ or lower, more preferably 6 W/cm$^2$ or lower. The power may be supplied in any form, such as a DC, RF or pulse voltage.

Also in the present invention, the deposition of the thin film of active material is preferably effected in an intermittent fashion. The intermittent deposition of the thin film of active material is effective to lower a deposition temperature, i.e., a maximum temperature attained during deposition of the thin film. This therefore enables deposition of the active material under the conditions that the intermetallic compound is hardly produced. One method of achieving intermittent deposition of the active material on the current collector is to place the current collector on an outer periphery of a drum-like holder and deposit the thin film of active material on the current collector while rotating the holder.

The above-described process for depositing the thin film by supplying a material thereof from a gas phase is preferably practiced under the following conditions.

A substrate temperature is preferably below 300° C., as described above. If the substrate temperature is excessively high, an intermetallic compound between the active material and the current collector constituent is occasionally formed.

The deposition rate is preferably 0.01 nm/sec (0.1 Å/sec) or above. If the deposition rate is excessively low, the influence of surface diffusion and rearrangement becomes significant, even at low temperatures, to bring the process close to a thermal equilibrium, resulting in the increased tendency to form the intermetallic compound.

A pressure (degree of vacuum) of the atmosphere is preferably in the approximate range of $10^{-2}$–$10^2$ Pa. If this atmospheric pressure (degree of vacuum) goes beyond the specified range, it becomes more likely that a thin film is provided as if formed by deposition of powder particles to result in the reduced adhesion thereof to the current collector. On the other hand, if the atmospheric pressure (degree of vacuum) falls below the specified range, the deposition rate becomes extremely slow to result in the increased tendency to produce the intermetallic compound, as described above.

As described earlier, when the thin film of active material is formed by sputtering, a power density applied to a target is preferably 50 W/cm$^2$ or less, more preferably 6 W/cm$^2$ or less. If the power density applied to the target is increased excessively, the influence of a radiation heat from a plasma becomes significant to result in the increased tendency of the active material to form the intermetallic compound.

The preferred sputtering gas is a gas which does not react with a target material such as silicon. From such a point of view, inert gases are preferred including He, Ne, Ar, Kr, Xe, Rn and the like. Among these gases, an Ar gas is particularly preferred for its ability to readily produce a plasma and provide a high sputtering efficiency.

A target for use in sputtering preferably has a single crystal or polycrystalline structure. Also preferably, its purity is at least 99%. These are to minimize inclusion of impurities in the resulting thin film of active material.

Preferably, an interior of a chamber before the start of thin-film deposition is maintained at a pressure of not exceeding 0.1 Pa. This is also effective to minimize inclusion of impurities in the resulting thin film of active material.

Before the deposition of the thin film, the current collector as the substrate is preferably subjected to a pretreatment, such as plasma irradiation. This plasma irradiation may be in the form of Ar or hydrogen plasma irradiation. The current collector can be cleaned at its surface by such a pretreatment. However, this pretreatment causes a temperature rise of the substrate. It is accordingly preferred that the substrate temperature is controlled to stay below 300° C.

The current collector as the substrate may preferably be subjected to cleaning before the deposition of the thin film to clean the surface of the current collector. Examples of useful cleaning agents include water, organic solvents, acids, alkalines, neutral detergents and combinations thereof.

Where the heat treatment is performed after deposition of the thin film, the heat treatment is preferably effected at a temperature of 650° C. or lower, more preferably 400° C. or lower. At higher temperatures, the intermetallic compound may be produced, as described earlier.

Preferably, the thin film of active material is deposited onto the current collector in an intermittent manner. It is accordingly preferred that the current collector is placed on an outer periphery of a drum-like holder and the thin film is deposited on the current collector while rotating the holder, or the current collector is placed on a reciprocating holder and the thin film is intermittently deposited on the current collector. A possible alternative is to arrange plural targets and allow the current collector to pass through regions opposing the respective targets in a sequential manner so as to deposit the thin film intermittently. Such intermittent deposition of the thin film of active material suppresses a temperature rise of the substrate. The thickness of the thin film deposited each time in the intermittent deposition is preferably 1 μm or less.

BEST MODE FOR CARRYING OUT THE INVENTION

Figure 1:
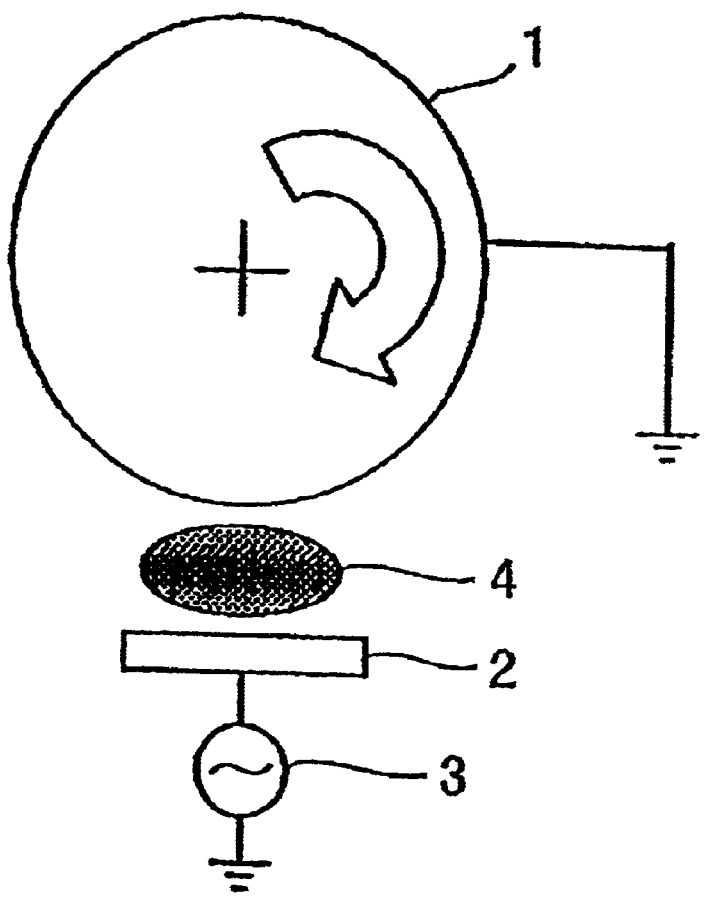
FIG. 1 is a schematic view showing the construction of a sputtering appratus including a rotating holder, as used in Examples in accordance with the present invention.

The present invention is below described in more detail by way of examples. It should be understood that the present invention is by no means limited by the folloiwng examples, and suitable changes and modifications can be effected without departing from the scope of the present invention.

EXPERIMENT 1

Fabrication of Negative Electrode

A rolled copper foil (about 26 $\mu$m thick) was roughend at its surface via copper deposition by an electrolytic process to provide a current collector. A silicon thin film was formed on the current collector using a parallel-plate. RF sputtering apparatus. An Ar gas alone was used as a sputtering gas. 99.999% pure, single crystal silicon was used as a target. The negative electrodes of Examples 1–7 and Comparative Examples 1–3 were fabricated under the thin-film forming conditions as specified in Tables 1 and 2, while adjusting a flow rate of the Ar gas or an opening degree of an exhaust valve. The silicon thin film was formed to a thickness of about 6 $\mu$m.

In Examples 1–3 and Comparative Examples 1–2, the substrate temperature was varied to form silicon thin films (thin films of active material) at different thin-film forming temperatures (maximum attainable temperatures). In Example 4 and Comparative Example 3, the deposited thin films were further subjected to a heat treatment under the conditions specified in Table 2. In Examples 5–7, the power density applied to the target was varied to form thin films.

The crystallinities of the resulting silicon thin films were identified by Raman spectroscopy. The silicon thin film was identified as being "amorphous" when the substantial presence of a peak around 480 $cm^{-1}$ and the substantial absence of a peak around 520 $cm^{-1}$ were observed and as being "polycrystalline" when the substantial absence of a peak around 480 $cm^{-1}$ and the substantial presence of a sigle peak around 520 $cm^{-1}$ were observed.

Each silicon thin film was deposited on a limited, 2.5 cm×2.5 cm surface region of the copper foil by using a mask. After deposition of the silicon thin film, a negative electrode tab was attached onto a surface portion of the copper foil that was left uncoated with the silicon thin film to complete a negative electrode.

Fabrication of Positive Electrode 90 parts by weight of $LiCoO_2$ powder and 5 parts by weight of artificial graphite powder as conductive material were mixed in a 5 wt.% N-methylpyrrolidone aqueous solution containing 5 parts by weight of polytetrafluoroethylene as a binder to provide a mix slurry for positive electrode. This slurry was coated by a doctor blade method onto a 2.5 cm×2.5 cm surface region of an aluminum foil (about 18 $\mu$m thick) serving as a positive current collector and then dried to provide a layer of positive active material. A positive electrode tab was attached onto a surface region of the aluminum foil that was left uncoated with the layer of positive active material to complete a positive electrode.

Preparation of Electrolyte Solution 1 mole/liter of $LiPF_6$ was dissolved in a mixed solvent containing equi-volumes of ethylene carbonate and dimethyl carbonate to prepare an electrolyte solution for use in the following battery construction.

Construction of Battery

Figure 2:
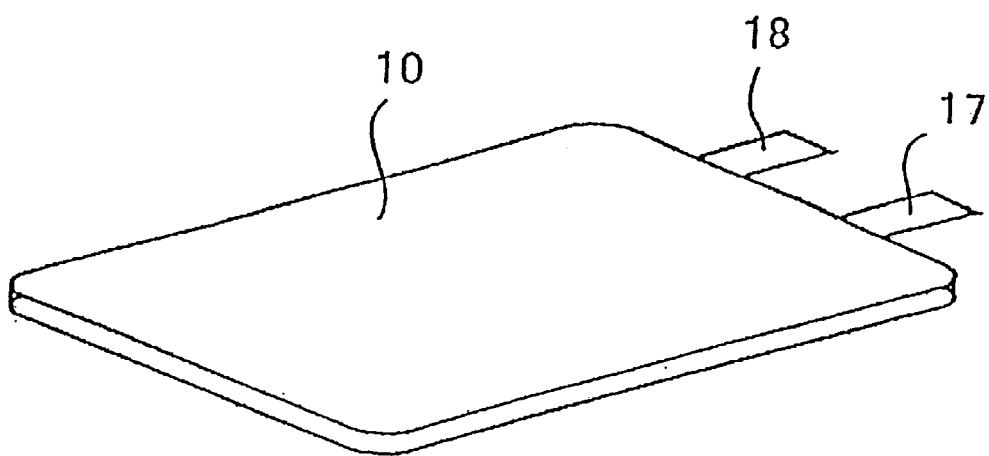
FIG. 2 is a perspective view showing a rechargeable lithium battery constructed in Examples in accordance with the present invention.
Figure 3:
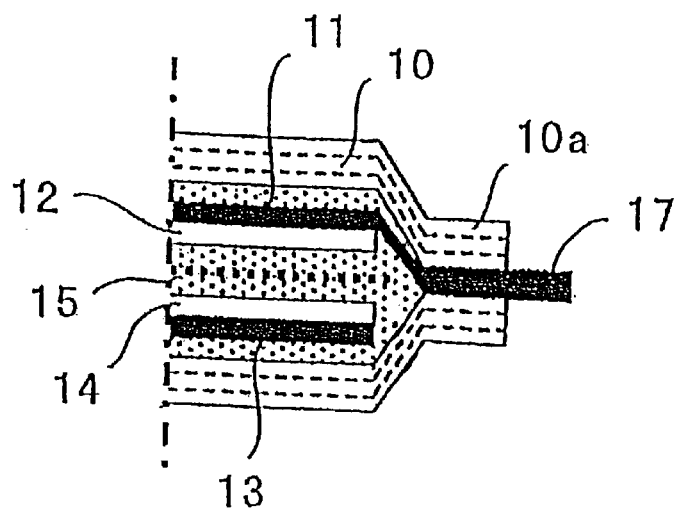
FIG. 3 is a schematic sectional view showing a rechargeable lithium battery constructed in Examples in accordance with the present invention.

FIG. 2 is a perspective view of such constructed rechargeable lithium battery. FIG. 3 is a schematic sectional view of the constructed rechargeable lithium battery. As shown in FIG. 3, the positive electrode and the negative electrode are inserted into an interior of a casing 10. A layer of negative active material in the form of a silicon thin film 12 is provided on a negative current collector 11. A layer 14 of positive active material is provided on a positive current collector 13. A separator 15 is interposed between the silicon thin film 12 and the layer 14 of positive active material. The electrolyte solution is introduced into the casing 10. The casing 10 is welded at its ends to define a sealed portion 10a. The negative electrode tab 17 attached to the negative current collector 11 extends thourgh the sealed portion 10a to an outside. Although not shown in FIG. 3, the positive electrode tab 18 attached to the positive current collector 13 also extends thourgh the sealed portion 10a to an outside.

Charge-Discharge Cycle Test

The rechargeable lithium batteries constructed in the manner as described above were subjected to a charge-discharge cycle test. Each battery was charged at a current of 9 mA to a charge end capacity of 9 mAh and then discharged at a current of 9 mA to a discharge end voltage of 2.75 V. This unit charge-discharge cycle was repeated to measure 1st-cycle, 5th-cycle and 20th-cycle discharge capacities and charge-discharge efficiencies. The results are shown in Tables 1 and 2. In the following Tables, the unit of flow rate, sccm, indicates a volumetric flow rate per minute ($cm^3$/minute) of a fluid at 0° C. at 1 atmospheric pressure (101.33 kPa) and is an abbreviation of standard cubic centimeters per minute.

TABLE 1

| | | Ex.1 | Ex. 2 | Ex. 3 | Comp. Ex. 1 | Comp. Ex. 2 |
|---|---|---|---|---|---|---|
| Thin Film Forming Conditions | Ar Flow Rate | 50 sccm | 50 sccm | 50 sccm | 50 sccm | 50 sccm |
| | Sputtering Atmosphere | 0.1 Pa | 0.1 Pa | 0.1 Pa | 0.1 Pa | 0.1 Pa |
| | Sputtering Power (Power Density W/cm$^2$) | 300 W (3.70) | 300 W (3.70) | 300 W (3.70) | 300 W (3.70) | 300 W (3.70) |
| | Substrate Temperature (Initial) | Ambient (Not Heated) | 200° C. | 250° C. | 300° C. | 400° C. |
| | Maximum Attainable Temperature | About 290° C. | About 290° C. | About 290° C. | About 320° C. | About 400° C. |
| Heat Treatment | Temperature, Time | Absent | Absent | Absent | Absent | Absent |
| | Crystallininity | Amorphous | Amorphous | Amorphous | Amorphous | Amorphous |
| 1st Cycle | Discharge Capacity (mAh/g) | 2144 | 2085 | 2546 | 524 | 707 |
| | Charge-Discharge Efficiency (%) | 78 | 75 | 97 | 49 | 59 |
| 5th Cycle | Discharge Capacity (mAh/g) | 2042 | 1963 | 2538 | 152 | 334 |
| | Charge-Discharge Efficiency (%) | 100 | 100 | 99 | 78 | 86 |
| 20th Cycle | Discharge Capacity (mAh/g) | 1924 | 1827 | 2456 | | |
| | Charge-Discharge Efficiency (%) | 99 | 99 | 99 | | |

TABLE 2

| | | Ex.4 | Comp. Ex. 3 | Ex. 5 | Ex. 6 | Ex. 7 |
|---|---|---|---|---|---|---|
| Thin Film Forming Conditions | Ar Flow Rate | 50 sccm | 50 sccm | 50 sccm | 50 sccm | 50 sccm |
| | Sputtering Atmosphere | 0.1 Pa | 0.1 Pa | 0.1 Pa | 0.1 Pa | 0.1 Pa |
| | Sputtering Power (Power Density W/cm$^2$) | 300 W (3.70) | 300 W (3.70) | 50 W (0.62) | 100 W (1.23) | 400 W (4.94) |
| | Substrate Temperature (Initial) | Ambient (Not Heated) | Ambient (Not Heated) | Ambient (Not Heated) | Ambient (Not Heated) | Ambient (Not Heated) |
| | Maximum Attainable Temperature | About 290° C. | About 290° C. | About 70° C. | About 150° C. | About 270° C. |
| Heat Treatment | Temperature, Time | 400° C., 1 h | 650° C., 1 h | Absent | Absent | Absent |
| | Crystallinity | Amorphous | polycrystalline | Amorphous | Amorphous | Amorphous |
| 1st Cycle | Discharge Capacity (mAh/g) | 2016 | 1976 | 2145 | 2419 | 2505 |
| | Charge-Discharge Efficiency (%) | 91 | 81 | 88 | 91 | 92 |
| 5th Cycle | Discharge Capacity (mAh/g) | 1913 | 729 | 1827 | 2296 | 2399 |
| | Charge-Discharge Efficiency (%) | 99 | 73 | 96 | 99 | 99 |
| 20th Cycle | Discharge Capacity (mAh/g) | 1816 | 348 | 1510 | 2182 | 2323 |
| | Charge-Discharge Efficiency (%) | 99 | 57 | 99 | 99 | 99 |

As clear from the results given in Table 1 for Examples 1–3 and Comparative Examples 1–2, high discharge capacities and satisfactory charge-discharge efficiencies are obtained when the thin-film forming temperature (maximum attainable temperature) is below 300° C.

As clear from the results given in Table 1 for Example 1 and the results given in Table 2 for Example 4 and Comparative Example 3, the silicon thin film is rendered into a polycrystalline form and the discharge capacity and charge-discharge efficiency drop when the deposition of the thin film was followed by heat treatment at a temperature of 650° C. This demonstrates that a temperature for the heat treatment is preferably below 650° C., more preferably 400° C. or lower.

As clear from the results given in Table 1 for Example 1 and the results given in Table 2 for Example 5–7, high discharge capacities and satisfactory charge-discharge efficiencies are obtained when the power density applied to a target during thin-film formation is 4.94 W/cm$^2$ or lower.

The negative electrodes fabricated in Examples 1–3 and Comparative Examples 1–2 by varying the substrate temperature so as to vary the thin-film forming temperature (maximum attainable temperature) were measured for a concentration distribution of a copper element in a depth direction by SIMS (secondary ion mass spectrometry). Each negative electrode before subjected to a charge-discharge test was measured for a concentration distribution of a copper element ($^{63}Cu^+$) using $O_2^+$ as a sputtering source.

Figure 4:
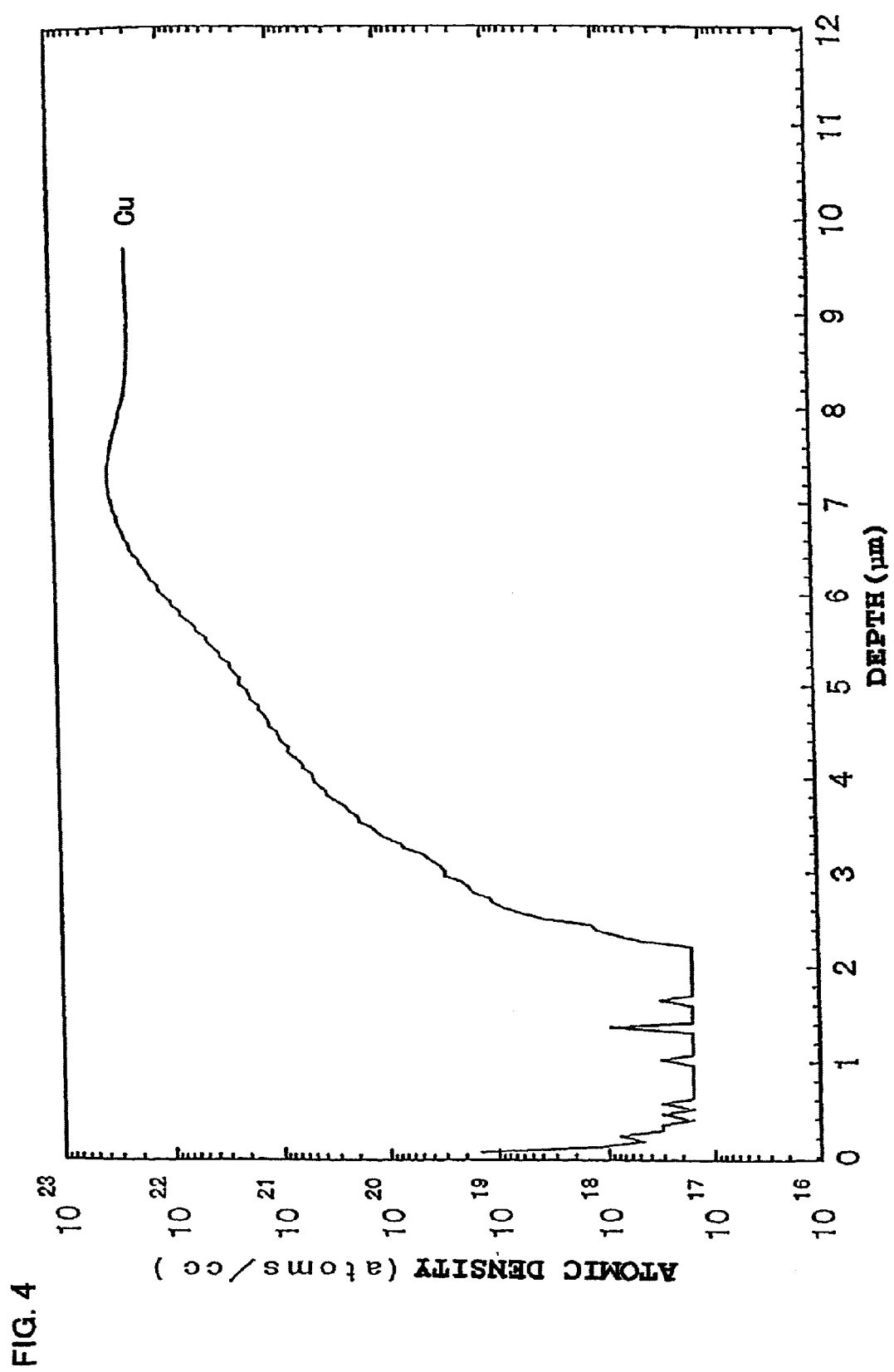
FIG. 4 is a graph showing a concentration distibution of a copper element along a depth of the electrode of Example 1.
Figure 5:
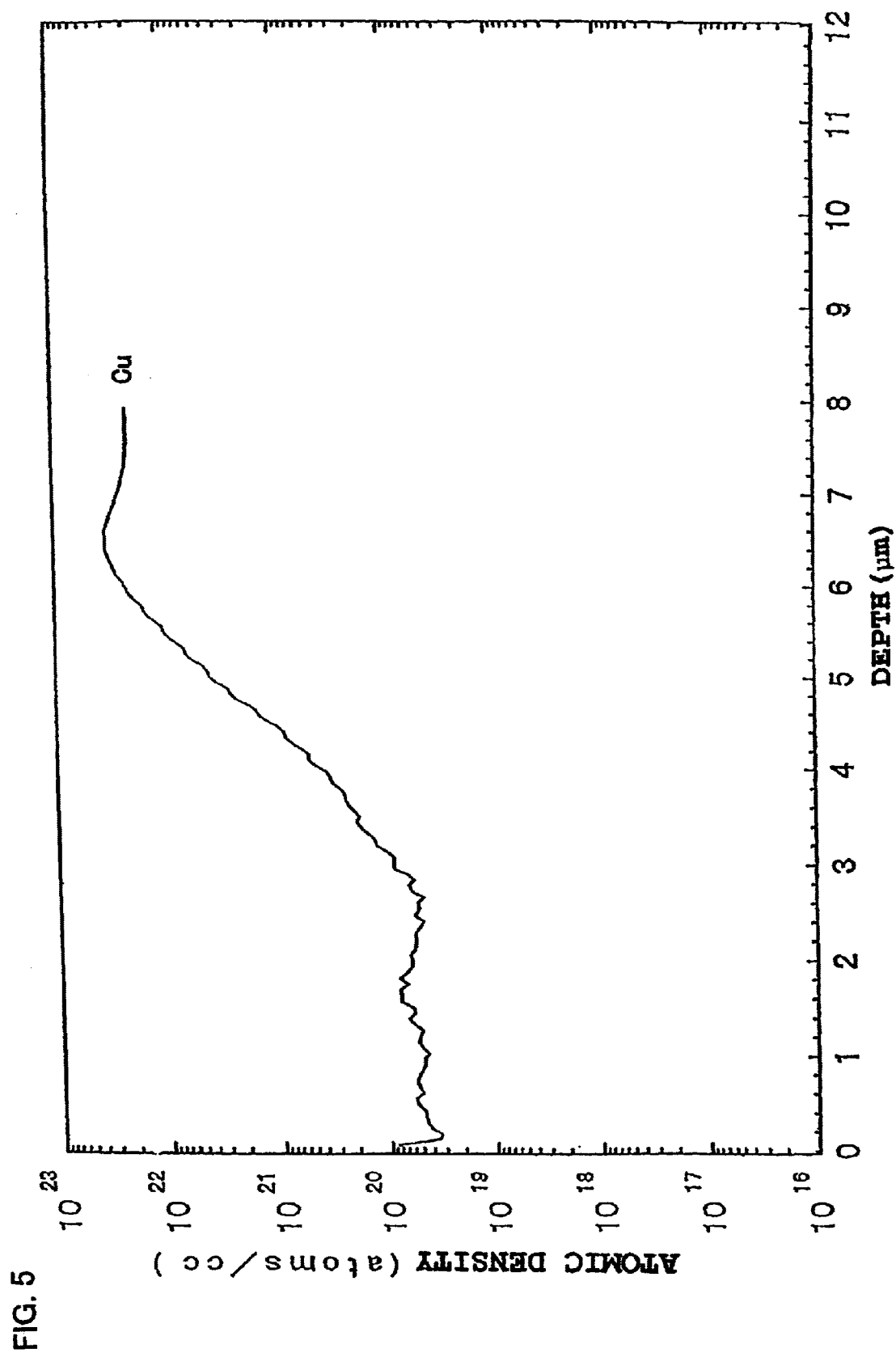
FIG. 5 is a graph showing a concentration distibution of a copper element along a depth of the electrode of Example 2.
Figure 6:
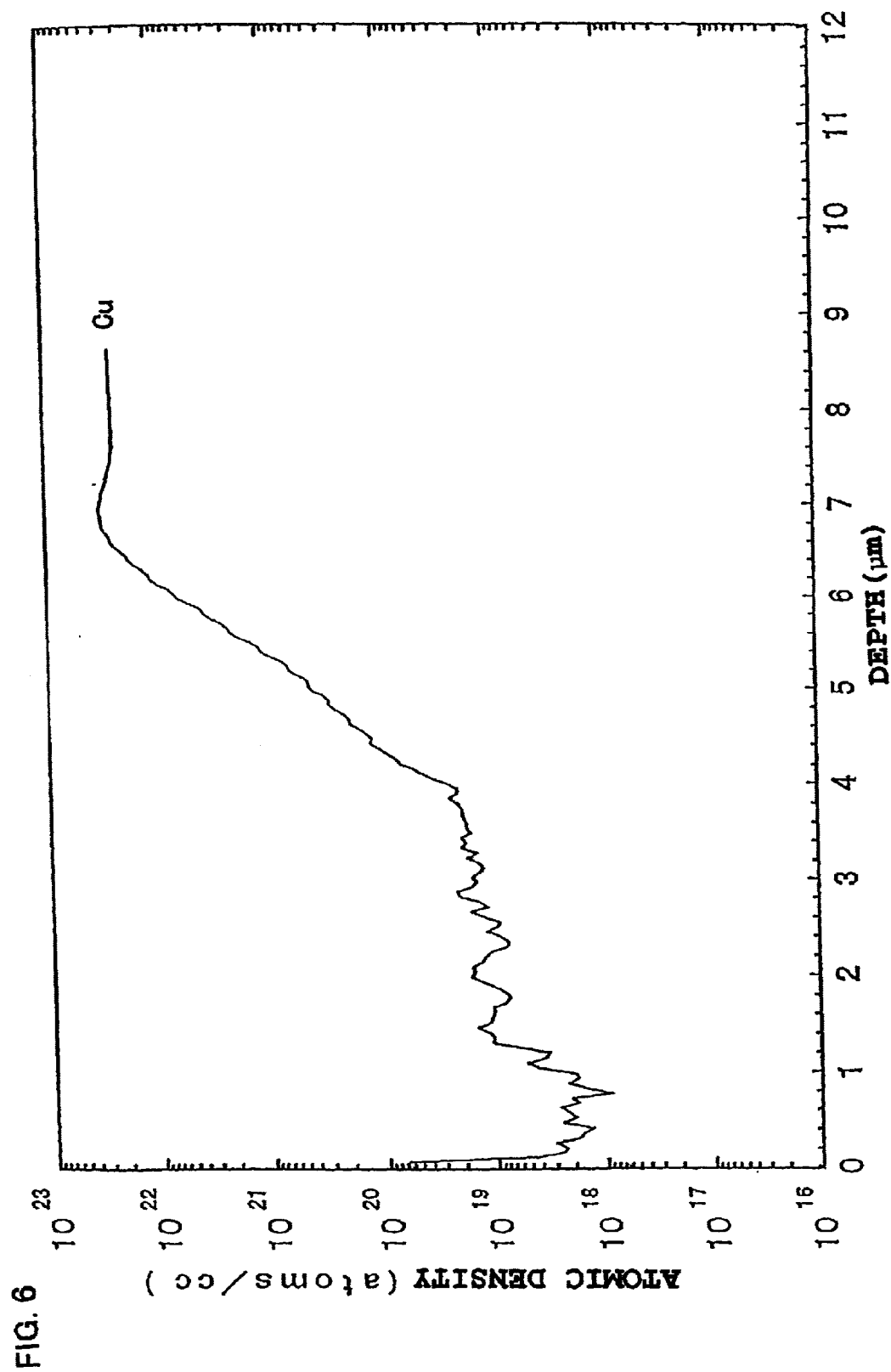
FIG. 6 is a graph showing a concentration distibution of a copper element along a depth of the electrode of Example 3.
Figure 7:
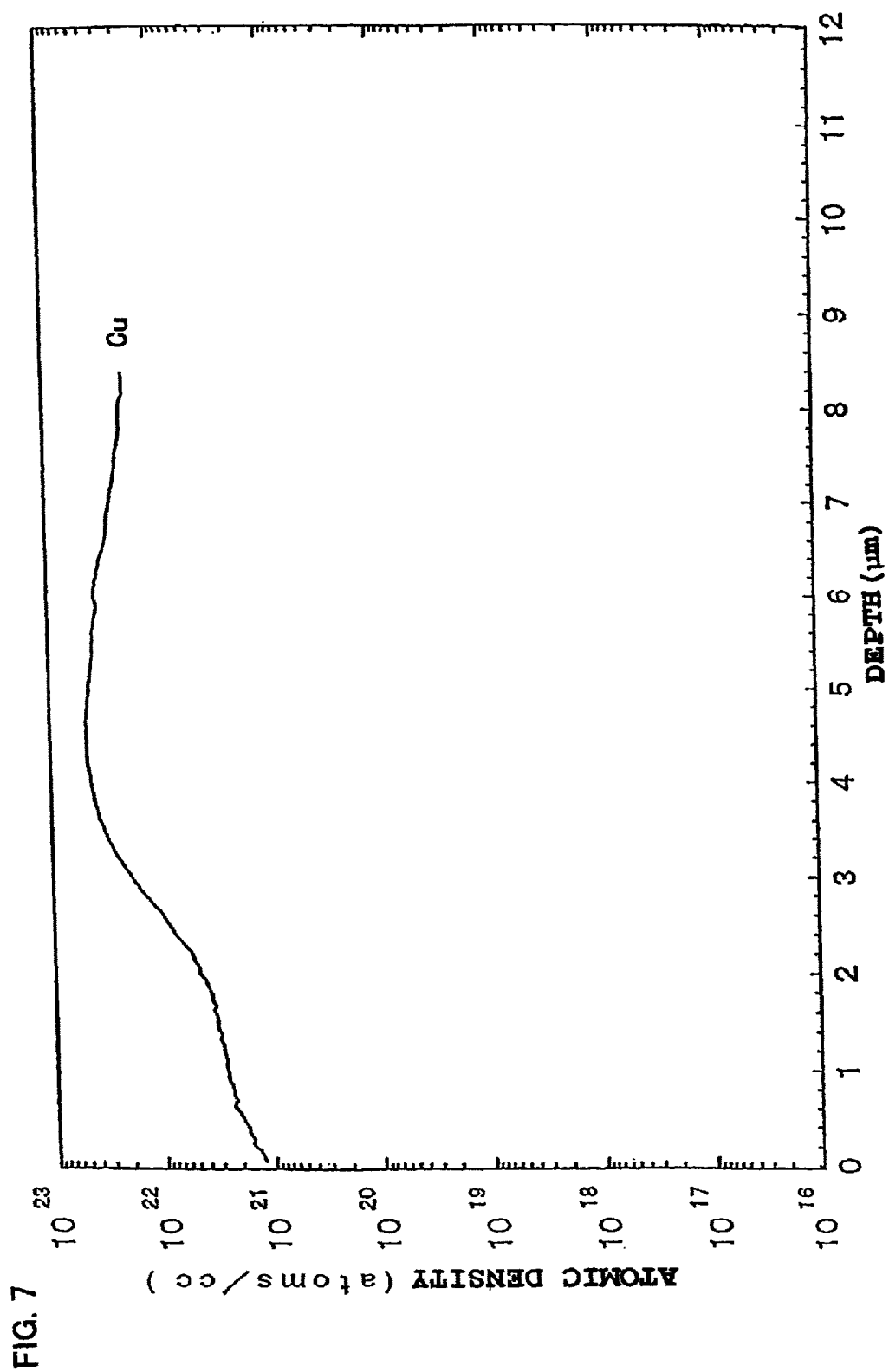
FIG. 7 is a graph showing a concentration distibution of a copper element along a depth of the electrode of Comparative Example 1.
Figure 8:
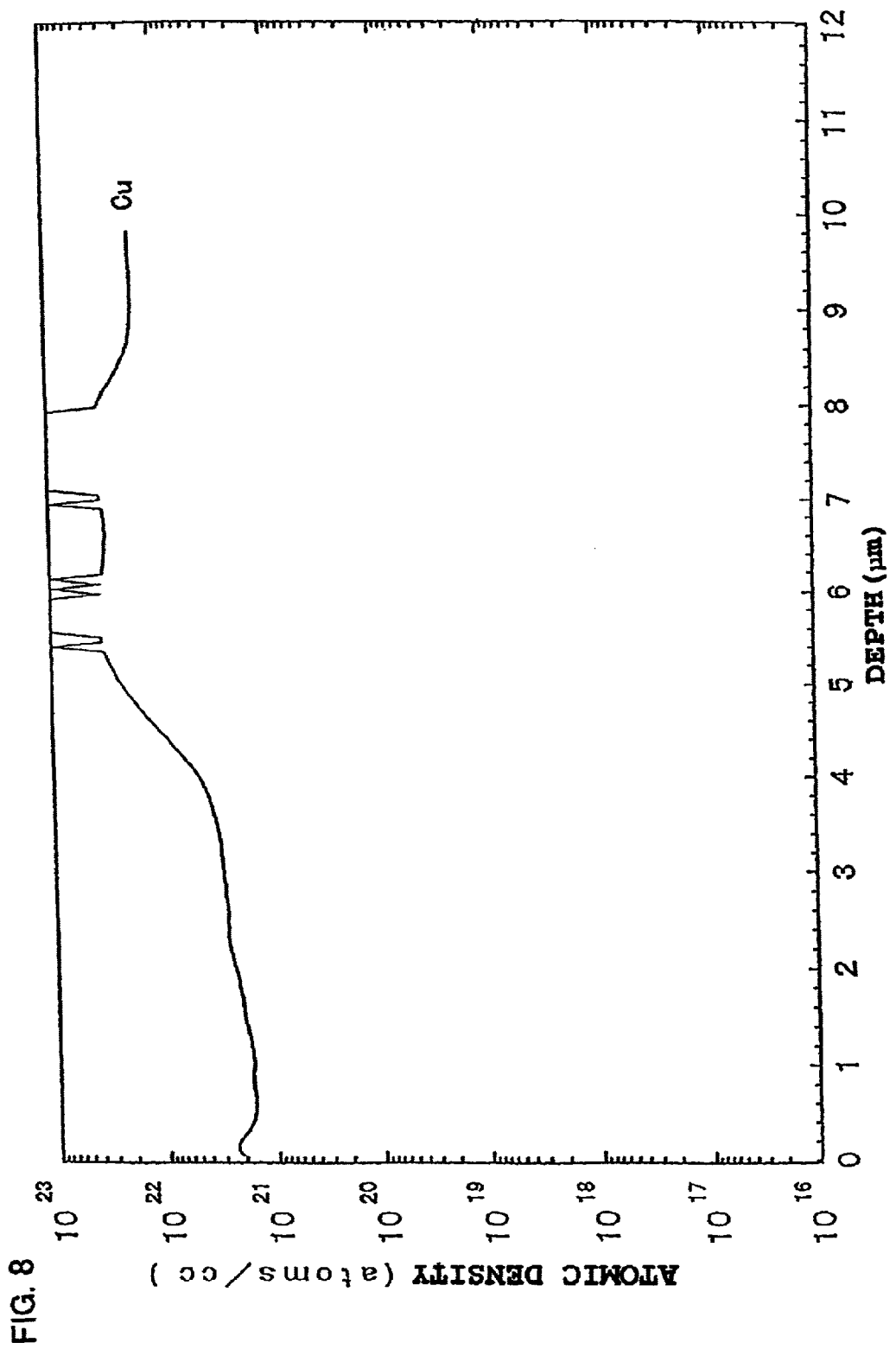
FIG. 8 is a graph showing a concentration distibution of a copper element along a depth of the electrode of Comparative Example 2.

FIGS. 4–8 illustrate concentration distributions of copper along depths of the negative electrodes fabricated in Examples 1–3 and Comparative Examples 1–2. Each abscissa indicates a depth ($\mu$m) and each ordinate indicates an atomic density (atoms/cc:atoms/cm$^3$). FIG. 4 corrsponds to Example 1, FIG. 5 to Example 2, FIG. 6 to Example 3, FIG. 7 to Comparative Example 1, and FIG. 8 to Comparative Example 2.

In any of FIGS. 4–8, the thin film has a thickness region, in the vicinity of its top surface, where the copper concentration shows no substantial change and is relatively low. The thin film also has a thickness region where the copper concentration increases from the top surface of the thin film toward an interface between the thin film and the current collector. The presence of such a thickness region with an increaseing copper concentration clearly indicates the existence of a mixed layer consisting of the active material and the copper element in the thin film adjacent the interface between the thin film and the current collector. The existence of such a mixed region (mixed layer) is believed to result in a marked improvement in adhesion between the current collector and the thin film.

In Examples 1–3 (FIGS. 4–6) where thin films of active material were deposited under the relatively low, substrate temperature conditions, the copper concentration near the top surface of each thin film is 10$^{20}$ atoms/cc (atoms/cm$^3$) (about 1%). On the other hand, in Comparative Examples 1–2 (FIGS. 7–8) where thin films of active material were deposited under the relatively high, substrate temperature conditions, the copper concentration near the top surface of each thin film is 10$^{21}$ atoms/cc (atoms/cm$^3$) (about 10%) or more. It is believed from these results that if the thin film of active material is formed at higher substrate temperatures, copper is diffused into an entire region of the thin film and a concentration of the active material relatively decreases to result in the reduced discharge capacity. It is also believed that existence of copper at a higher concentration in the thin film causes the poorer cycle characteristics. This is probably due to the production of an intermetallic compound in the thin film.

EXPERIMENT 2

Fabrication of Negative Electrode

An RF sputtering apparatus with a rotating holder, as shown in FIG. 1, was utilized to form a silicon thin film. The silicon thin film was deposited onto a current collector similar in type to that used in Experiment 1. The current collector was placed on an outer periphery of the rotating holder 1 shown in FIG. 1. While the rotating holder 1 was rotated, a radio-frequency (RF) power from an RF power supply 3 was supplied to the target 2 to generate an Ar plasma 4, so that the silicon thin film was deposited on the current collector. The rotating holder 1 was rotated at a speed of about 10 rpm. Other thin-film forming conditions are specified in Table 3. An Ar gas alone was used for the sputtering gas. The target used was similar in type to that specified in Experiment 1. The silicon thin film was deposited to a thickness of about 6 $\mu$m.

Construction of Battery and Charge-Discharge Cycle Test

Using a positive electrode similar in type to that fabricated in Experiment 1, a rechargeable lithium battery was constructed in the same manner as in Experiment 1. The battery was subsequently subjected to the charge-discharge cycle test specified in Experiment 1. The results are shown in Table 3.

TABLE 3

|  |  | Ex. 8 |
|---|---|---|
| Thin Film Forming Conditions | Ar Flow Rate | 50 sccm |
|  | Sputtering Atmosphere | 0.1 Pa |
|  | Sputtering Power | 350 W |
|  | (Power Density W/cm$^2$) | (4.32) |
|  | Substrate Temperature (Initial) | Ambient (Not Heated) |
|  | Speed of Holder Rotation | 10 rpm |
|  | Maximum Attainable Temperature | About 210° C. |
| Heat Treatment | Temperature, Time | Absent |

|  | Crystallinity | Amorphous |
|---|---|---|
| 1st Cycle | Discharge Capacity (mAh/g) | 3045 |
|  | Charge-Discharge Efficiency (%) | 95 |
| 5th Cycle | Discharge Capacity (mAh/g) | 3172 |
|  | Charge-Discharge Efficiency (%) | 100 |
| 20th Cycle | Discharge Capacity (mAh/g) | 3016 |
|  | Charge-Discharge Efficiency (%) | 100 |

As apparent from the results shown in Table 3, the deposition temperature (maximum attainable temperature) in Example 8 is lower than in Example 1, although the power density applied to the target in Example 8 is slightly higher than in Example 1 and the remaining forming conditions are identical. In Example 8, the current collector is placed on a rotating holder and the active material is deposited thereon while the rotating holder is rotated so that the deposition of silicon on the current collector is achieved in an intermittent manner. This is believed to successfully hold the maximum attainable temperature down at a lower level. It is also appreciated that slightly better discharge capacity and charge-discharge efficiency are obtained in Example 8 than in Example 1.

EXPERIMENT 3

The same parallel-plate sputtering apparatus as in Experiment 1 was used. The procedure of Example 1 of Experiment 1 was followed, except that a DC or pulse power, instead of the radio-frequency (RF) power, was applied to the target at the power density specified in Table 4, to deposit a silicon thin film on a current collector and fabricate a negative electrode.

Construction of Battery and Charge-Discharge Cycle Test

Using a positive electrode similar in type to that fabricated in Experiment 1, a rechargeable lithium battery was constructed in the same manner as in Experiment 1. The battery was subsequently subjected to the charge-discharge cycle test specified in Experiment 1. The results are shown in Table 4.

TABLE 4

|  |  | Ex. 9 | Ex. 10 |
|---|---|---|---|
| Thin Film Forming Conditions | Ar Flow Rate | 85 sccm | 85 sccm |
|  | Sputtering Atmosphere | 0.4 Pa | 0.4 Pa |
|  | Power Source | DC | Pulse (100 kHz) |
|  | Sputtering Power (Power Density W/cm$^2$) | 210 W (2.58) | 420 W (5.17) |
|  | Substrate Temperature (Initial) | Ambient (Not Heated) | Ambient (Not Heated) |
|  | Maximum Attainable Temperature | About 200° C. | About 100° C. |
| Heat Treatment | Temperature, Time | Absent | Absent |
|  | Crystallinity | Amorphous | Amorphous |
| 1st Cycle | Discharge Capacity (mAh/g) | 2340 | 2796 |
|  | Charge-Discharge Efficiency (%) | 97 | 96 |
| 5th Cycle | Discharge Capacity (mAh/g) | 2349 | 2743 |
|  | Charge-Discharge Efficiency (%) | 100 | 100 |
| 20th Cycle | Discharge Capacity (mAh/g) | 2361 | 2739 |
|  | Charge-Discharge Efficiency (%) | 99 | 99 |

As can be clearly seen from the results shown in Table 4, the use of a DC or pulse power source results in the deposition temperature (maximum attainable temperature) that is lower than that in Example 1. Also, the rechargeable lithium batteries give satisfactory discharge capacity and charge-discharge efficiency results which are almost comparable to those of Example 1.

Although the thin films of active material are formed by a sputtering technique in the preceding Examples, the present invention is not limited thereto. The CVD or other thin-film forming processes can also be used.

UTILITY IN INDUSTRY

In accordance with the present invention, an electrode for a rechargeable lithium battery can be stably fabricated which exhibits a high charge-discharge capacity and superior charge-discharge cycle characteristics.

What is claimed is:

1. A method for fabricating an electrode for a rechargeable lithium battery which includes depositing a thin film composed of active material capable of alloy formation with lithium on a current collector made of a metal incapable of alloy formation with lithium, by using a process for depositing a thin film by supplying a material from a gas phase, characterized in that said thin film of active material is deposited at such a temperature that enables formation of a mixed layer via diffusion of a constituent of the current collector into the thin film in the vicinity of an interface therebetween but does not cause production, in said mixed layer, of an intermetallic compound between the active material and the current collector constituent.

2. The method for fabricating an electrode for a rechargeable lithium battery as recited in claim 1, characterized in that said thin film of active material is deposited at the temperature of below 300° C.

3. The method for fabricating an electrode for a rechargeable lithium battery as recited in claim 1, characterized in that a heat treatment is carried out after said thin film of active material is deposited on the current collector.

4. The method for fabricating an electrode for a rechargeable lithium battery as recited in claim 3, characterized in that said heat treatment is carried out at a temperature of below 650° C.

5. The method, for fabricating an electrode for a rechargeable lithium battery as recited in claim 1, characterized in that said active material is composed mainly of silicon or germanium.

6. The method for fabricating an electrode for a rechargeable lithium battery as recited in claim 1, characterized in that said thin film of active material is an amorphous or microcrystalline silicon thin film.

7. The method for fabricating an electrode for a rechargeable lithium battery as recited in claim 1, characterized in that said thin film of active material is an amorphous germanium, microcrystalline germanium, amorphous silicon-germanium alloy or microcrystalline silicon-germanium alloy thin film.

8. The method for fabricating an electrode for a rechargeable lithium battery as recited in claim 1, characterized in that at least a surface portion of said current collector is composed mainly of copper.

9. The method for fabricating an electrode for a rechargeable lithium battery as recited in claim 1, characterized in that said thin film of active material is deposited by sputtering.

10. The method for fabricating an electrode for a rechargeable lithium battery as recited in claim 1, characterized in that said thin film of active material is deposited on the current collector in an intermittent manner.

11. The method for fabricating an electrode for a rechargeable lithium battery as recited in claim 10, characterized in that said thin film of active material is deposited on the current collector in an intermittent manner by placing the current collector on an outer periphery of a drum-like holder and then depositing the thin film of active material on the current collector while the holder is rotated.

* * * * *